United States Patent
Broder et al.

[11] Patent Number: 5,995,365
[45] Date of Patent: Nov. 30, 1999

[54] COMPUTER WITH HARD DISK DRIVE CARRIER

[75] Inventors: Damon Broder; Andrew Moore, both of Austin, Tex.

[73] Assignee: Dell U.S.A. L.P., Round Rock, Tex.

[21] Appl. No.: 08/905,592

[22] Filed: Aug. 4, 1997

[51] Int. Cl.[6] ................................................ G06F 1/16
[52] U.S. Cl. ........................ 361/685; 361/727; 439/77
[58] Field of Search ................................. 361/685, 727, 361/789, 826; 439/67, 76.1, 77, 928.1; 174/117 F, 117 FF, 117 R, 117 AS, 126.3, 254

[56] References Cited

U.S. PATENT DOCUMENTS

| | | | |
|---|---|---|---|
| 4,838,420 | 6/1989 | Collett et al. ............................ | 361/685 |
| 4,947,093 | 8/1990 | Dunstan et al. . | |
| 5,038,308 | 8/1991 | Le et al. ................................... | 361/685 |
| 5,132,876 | 7/1992 | Ma .......................................... | 361/685 |
| 5,149,048 | 9/1992 | Morehouse et al. ..................... | 248/632 |
| 5,161,770 | 11/1992 | Morehouse et al. . | |
| 5,227,929 | 7/1993 | Comerford . | |
| 5,330,365 | 7/1994 | Leeson ..................................... | 439/77 |
| 5,331,455 | 7/1994 | Ho .......................................... | 361/685 |
| 5,426,562 | 6/1995 | Morehouse et al. . | |
| 5,548,480 | 8/1996 | Rudi et al. .............................. | 361/685 |
| 5,557,075 | 9/1996 | Nugent ................................... | 174/254 |
| 5,566,383 | 10/1996 | Gildea et al. ........................... | 361/685 |
| 5,606,519 | 2/1997 | Viletto ..................................... | 361/685 |
| 5,652,695 | 7/1997 | Schmitt . | |
| 5,680,293 | 10/1997 | McAnally et al. . | |
| 5,687,059 | 11/1997 | Hoppal ................................... | 361/685 |

*Primary Examiner*—Donald Sparks
*Assistant Examiner*—Lisa Lea-Edmonds
*Attorney, Agent, or Firm*—Haynes and Boone, L.L.P.

[57] ABSTRACT

A computer in which a hard drive-carrier assembly is mounted in the computer enclosure and includes a housing defining a space, and a hard drive mounted in the space. The dimensions of the space are slightly less that the corresponding exterior dimensions of the hard drive to provide an interference fit between the hard drive and the housing. The housing is mounted in a cage formed by a plurality of articulated arms and a flexible connector is provided that connects the hard drive to the computer's motherboard.

22 Claims, 2 Drawing Sheets

COMPUTER WITH HARD DISK DRIVE CARRIER

TECHNICAL FIELD

The invention relates generally to the field of computers, and more particularly, to computers having a internal hard disk drive.

BACKGROUND

Most computers include an internal hard disk drive which is manufactured separately from the other computer components and installed in the computer (or central processing unit) enclosure. The hard drive is the most common source of field failures, especially with respect to portable computers, such as laptops, notebooks and the like, which are often dropped or otherwise jarred during use or when being transported. Since fragility is a common cause of these failures, one approach to reduce the number of hard drive failures is to fit the drive into an area in the computer enclosure which is as close as possible to the size of the hard drive. This reduces the amplified shock resulting from relative movement between the hard drive and it surroundings. However, this is a less than satisfactory solution since, due to variations in the dimensional tolerances of the hard drive, the computer enclosure and the surrounding components, a certain amount of this amplified shock will always occur.

Therefore, what is needed is a carrier for the hard drive of a computer that protects the hard drive from shock that occurs when the hard drive or the computer is dropped or jarred, and is not affected by variation in dimensional tolerances of the hard drive, the computer enclosure, and the surrounding components.

SUMMARY

Accordingly, an embodiment of the present invention is directed to a computer having a carrier for its hard drive that suspends the hard drive using a load stiffening system. More particularly, the embodiment features a carrier that includes a housing of a compliant material that defines a space for receiving the hard drive. The dimensions of the space are slightly less that the corresponding exterior dimensions of the hard drive to provide an interference fit between the hard drive and the housing. The housing is mounted in a cage formed by a plurality of articulated arms and a connector is provided that connects the hard drive to the computer's motherboard.

Advantages are achieved by the above embodiment since the shock amplification using the above carrier is relatively low when compared to the prior techniques discussed above. Also, the hard drive is well protected when carried as a peripheral accessory externally of the computer enclosure. Further, the carrier also compensates for dimensional tolerances in the hard drive and its associated components to the extent that the connecters associated with the hard drive more easily connect to associated connectors in the computer enclosure.

DETAILED DESCRIPTION OF THE PREFERRED EMBODIMENT

Figure 1:
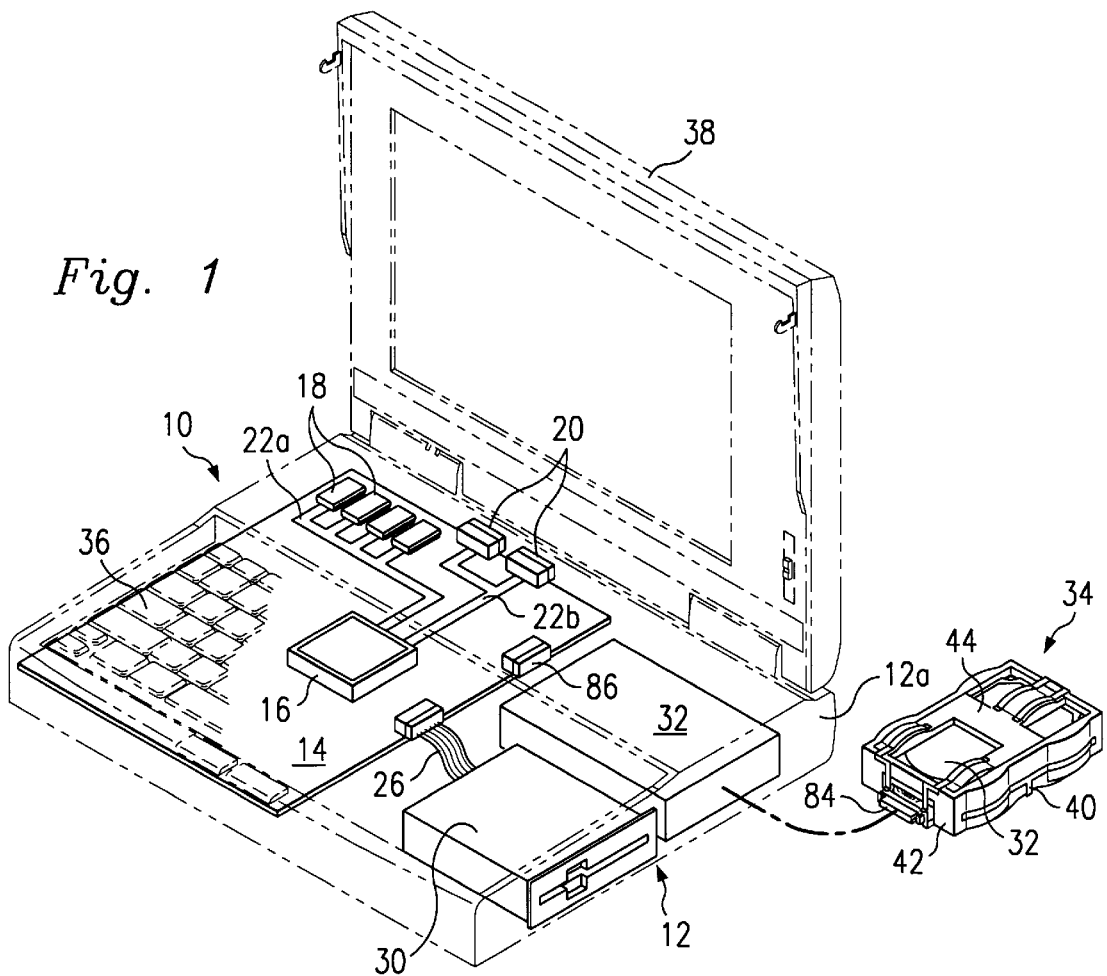
FIG. 1 is an isometric view of a portable computer according to an embodiment of the present invention.

Referring to FIG. 1 of the drawings, the reference numeral 10 refers, in general, to a portable computer according to an embodiment of the present invention, which can be a laptop computer, a notebook computer, or the like. The computer 10 includes an enclosure 12 (shown in phantom lines) in which a motherboard 14 is mounted. A processor 16, four memory modules 18, and two input/output (I/O) devices 20 are mounted on the motherboard 14. Buses 22a and 22b are also provided on the motherboard 14 that connect the processor 16 to the memory modules 18 and to the input/output devices 20, respectively. A pair of cable assemblies 26 and 28 connect the motherboard 14 to a floppy disk drive 30 and to a hard drive 32 which is encased in a carrier 34 to be described. The hard drive 32 and the carrier 34 are shown schematically inside the enclosure 12 in FIG. 1 and in more detail outside of the enclosure. It is understood that a battery and other components, electrical traces, electrical circuits and related devices are provided in the enclosure 12 but are not shown since they all are conventional.

A keyboard 36 (shown partially in FIG. 1) encloses the above components and forms a portion of the upper surface of the enclosure 12. A cover 38 is hinged to the rear end portion of the enclosure 12 in any known manner and can be moved between the open position shown and a closed position in which it covers the upper surface of the enclosure 12, including the keyboard 30.

Figure 2:
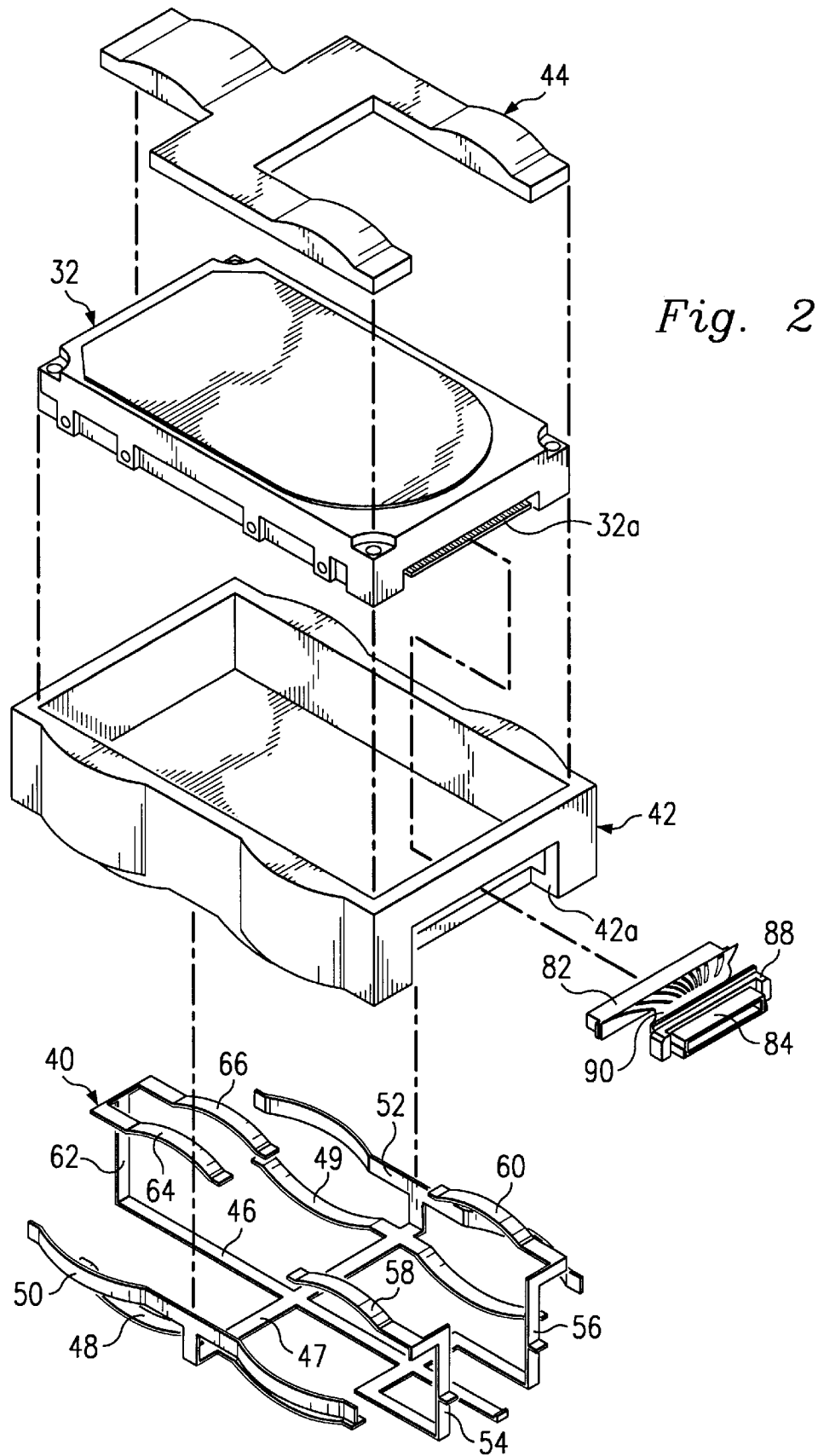
FIG. 2 is an exploded isometric view of the hard drive and carrier of the portable computer of FIG. 1.

The hard drive 32 and the carrier 34 are shown in detail in FIG. 2 and, for the convenience of presentation, have been rotated 180 degrees from their position inside the computer enclosure 12 shown in FIG. 1. The carrier 34 consists of a friction cage 40 which receives a housing 42, which, in turn, receives the hard drive 32. A cover 44 is mounted in the housing 42 and extends over the upper surface of the hard drive 32.

The friction cage 40 is formed by a series of articulated arms that form a flexible assembly for receiving the housing 42. Two intersecting arms 46 and 47 form a base, or hub, and two arms 48 and 49 extend from the respective ends of the arm 47 and parallel to the arm 46. Two horizontal arms 50 and 52 extend parallel to the arms 48 and 49, respectively, and two vertically-extending arms 54 and 56 extend upwardly from the arm 46 near one end thereof and engage one end of the housing 42. Two horizontal arms 58 and 60 extend from the arms 54 and 56, respectively for engaging the cover 44. A vertically extending arm 62 extends from the other end of the arm 46 for engaging the other end of the housing 42, and two horizontal arms 64 and 66 extend from the arm 62 and also engage the cover 44. An open area is defined in the cage 40 for receiving the housing 42, and the arms 48, 49, 50, and 52 all have curved, or arcuate portions, that engage corresponding curved outer surface portions of the housing 42. The arms 46–66 are fabricated of a material and are connected in a manner to form an articulated structure to permit relative movement between the arms. Thus, the arms 46–66 can flex slightly to permit insertion of the housing 42 in the cage 40 and to place the arms under tension, as will be explained.

The housing 42 is preferably formed of a compliant foam material, such as viscoelastic urethane foam, and is rectangular in cross section. The housing 42 has an open upper end and defines a space for receiving the hard drive 32 having dimensions that are slightly less than the corresponding exterior dimensions of the hard drive 32. As a result, when the hard drive 32 is inserted in the housing 42, a slight interference is created thus eliminating any relative movement between the drive and the housing.

The cover 44 is also preferably formed of a compliant foam material, such as viscoelastic urethane foam, and is adapted to extend in the upper portion of the housing 42 and over the hard drive 32. The cover 44 is shaped to form open areas for allowing the transmission of thermal energy from the hard drive 32 without compromising the shock absorbency of the carrier 34 in a plane normal to the hard drive.

To assemble the hard drive 32 in the carrier 34, the housing 42 is initially inserted into the friction cage 40. In this context, the specific dimensions of the cage 40 are such that the above-mentioned area defined by the cage for receiving the housing 42 is slightly less than the corresponding external dimensions of the housing. Therefore, the housing 42, which is formed of the compliant material discussed above, is folded over, or bent, as necessary, and the flexible arms 50, 52, 54, 56, and 62 are forced slightly outwardly, to enable the housing 42 to be inserted in the area defined by the friction cage 40. After this insertion, the housing 42 is released and allowed to expand back to its original non-folded state which thus places the latter arms under a slight tension to insure a tight fit of the housing 42 in the friction cage 34.

The hard drive 32 is then tilted, or rotated, as necessary to enable it to clear the arms 58, 60, 64 and 66 of the cage 34 and to be inserted in the housing 42 through its open upper end in an interference fit, as discussed above. The arms 58, 60, 64, and 66 are forced slightly upwardly, as viewed in FIGS. 1 and 2 to enable the cover 44 to be placed in the upper portion of the housing 42 and over the upper surface of the hard drive 32. In this context, the height, or thickness, of the cover 44 is such that the arms 58, 60, 64, and 66 are placed in a slight tension when the cover is released and allowed to return to its original shape. With the hard drive 32 thus filly encapsulated in the carrier 34, the hard drive-carrier assembly can be carried as a peripheral accessory externally of the computer enclosure 12 without any danger of damage to the hard drive if the assembly is dropped or otherwise subjected to shock forces.

Figure 3:
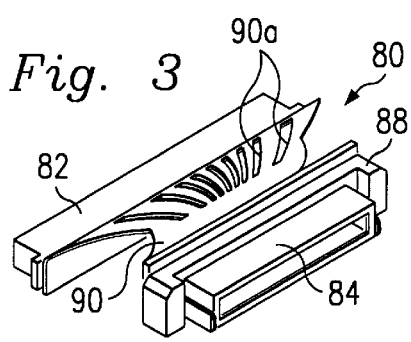
FIG. 3 is an isometric view of a connector assembly used to connect the hard drive of FIGS. 1 and 2 to the computer of FIG. 1.

Referring to FIG. 3, when it is desired to install the hard drive 32, as encapsulated in the carrier 34, in the computer enclosure 12, a connector assembly 80 is provided for enabling the hard drive 32 to be electrically connected to the motherboard 14 (FIG. 1) of the computer 10. To this end, the computer enclosure 12 (FIG. 1) has a sidewall 12a provided with an opening for receiving the carrier 34, the hard drive 32 has a standard connecter 32a (FIG. 2) formed in an end wall, and the housing 42 has a corresponding opening 42a formed in an end wall. The assembly 80 includes a connector 82 for extending through the opening 42a in the housing 42 and for connecting to the connector 32a of the hard drive 32. The assembly 80 also includes a connector 84 for connecting to a corresponding receptacle, or connector 86 (FIG. 1) provided on the motherboard 14 of the computer 10. A mounting board 88 is also provided which is secured to the rear portion of the connector 84 for snap mounting the assembly between the two upright arms 54 and 56 (FIG. 2) of the cage 40 in any known manner. A perforated, ribbon-type cable 90 electrically connects the mounting board 88 to the connector 82, and a plurality of perforations 90a are provided though the cable to increase its flexibility so that it will transfer only a minimal amount of shock forces applied thereto in and about all three major Cartesian axes.

To install the carrier 34 containing the hard drive 32 in the enclosure 12 of the computer 10, the carrier 34 is inserted into and though the above-mentioned opening in the sidewall 12a and into the enclosure in a direction indicated by the arrow in FIG. 1, that is, towards the other side wall of the enclosure and towards the motherboard 14. In this context, it is understood that brackets, guide rails, or the like (not shown) may be provided in the housing 42 to facilitate this insertion and the mounting of the carrier 34 in the housing. When the carrier 34 approaches the motherboard 14, the connector 84 of the assembly 80 will engage the connector 86 on the motherboard 14 to complete the electrical connection between the hard drive 32 and the motherboard. Of course, the hard drive 32 can easily be removed from the computer enclosure 12 while encapsulated in the carrier 34 by simply pulling outwardly on the carrier and removing it through the above-mentioned opening the sidewall 12a.

The hard drive 32 is well protected by the housing 42, the cover 44 and the cage 40, since the housing and the cover are formed of a compliant foam material, such as viscoelastic urethane foam, which is normally soft and compliant, as discussed above, but stiffens in proportion to the rate of any load applied thereto. Thus, the housing 42 and the cover 44 each exhibit relatively low stiffness, or resistance to deformation, in the presence of low shock forces, such as those encountered during normal use; while providing a high stiffness in the presence of a large, high-energy shock force thus preventing any shock amplification. This protection of the hard drive 32 applies when the hard drive-carrier assembly is mounted in the computer enclosure or when carried as a peripheral accessory externally of the computer enclosure.

Therefore, if the carrier 34, containing the hard drive 32, or the computer 10 containing the carrier and the hard drive, is dropped or otherwise subjected to a relatively large high-energy shock force, or the like, the arms 46–66 of the cage 40 will initially be subjected to the latter force. The latter arms will, in turn, strike a corresponding portion of the housing 42 and/or the cover 44 with essentially the same high energy shock force. However, since the housing 42 is fabricated from the viscoelastic material discussed above, the corresponding portions of the housing 42 and/or the cover 42 will stiffen in proportion to the rate of the load and thus resist the load and insulate the hard drive 32 from the load and thus prevent any shock amplification.

In addition to protecting the hard drive from relatively large, high-energy shock forces, the carrier 32 is not affected by variation in dimensional tolerances of the hard drive, the computer enclosure and the surrounding components.

Other advantages stem from the design of the present invention. For example, the insertion, and any necessary removal of the carrier 34 from the computer enclosure 12, places an external load on the friction cage 40. However, as a result of the design of the cage 40, it is symmetrically loaded so that, as it tries to retract under the external forces thereon during the insertion and removal process, all the arms 46–66 move towards the center hub of the cage 40 defined at the intersection of the arms 46 and 47. This prevents the housing 42 from deforming in response to these internal loads. Also, the perforated cable 90 will transfer little, if any, shock forces applied thereto in and about all three major Cartesian axes, thus minimizing any negative effects to the electrical connection between the hard drive 32 and the motherboard 14 if the cable is subjected to the latter forces.

It is understood that variations may be made in the foregoing without departing from the scope of the invention. For example, the embodiment described above is not limited to use with the particular type of portable computer as described above by means of example, but is equally applicable to any type of computer or data processing and/or storage device. Also, the present invention is not limited to the particular location of the hard drive and its carrier in the computer enclosure. Further, the specific shape of the housing 42, the friction cage 40 including the arms 46–66, and the cover 44 can be varied within the scope of the invention. Also, the specific design of the cable 90 of the connector assembly 80 can be varied within the scope of the invention. For example, the ribbon-type cable can be replaced by a discrete wire assembly as long as the latter is sufficiently flexible to transfer little, if any, forces applied thereto in the plane of the cable.

It is also understood that the embodiment of the assembly of the present invention described above is intended to illustrate rather than limit the invention, and that the mounting assembly can take many other forms and embodiments within the scope of the invention.

What is claimed is:

1. A computer comprising an enclosure, a processor disposed in the enclosure, a memory device disposed in the enclosure, a hard drive-carrier assembly mounted in the enclosure, the assembly comprising a housing formed of a compliant material disposed in the enclosure and defining a space, and a hard drive mounted in the space of the housing, the dimensions of the space being slightly less than the corresponding exterior dimensions of the hard drive to provide an interference fit between the hard drive and the housing, wherein the housing has a removable cover extending over the upper portion of the hard drive, and a cage formed by a plurality of articulated arms that define an area for receiving the housing.

2. The computer of claim 1 wherein the arms are adapted to flex, the dimensions of the area defined by the cage being less than that of the housing so that, when the housing is placed in the area, at least a portion of the arms are placed under tension.

3. The computer of claim 1 wherein the computer further comprises a motherboard, and wherein the assembly further comprises a first connector connected to the hard drive, a second connector adapted to connect to the motherboard and a flexible cable extending between, and connected to, the first and second connectors, to reduce the transfer of shock forces applied thereto in and about all three major Cartesian axes.

4. The computer of claim 3 wherein the second connector is connected to the cage.

5. A hard drive-carrier assembly for a computer, the assembly comprising a housing of a compliant material defining a space, a hard drive mounted in the space of the housing, the dimensions of the space being slightly less than the corresponding exterior dimensions of the hard drive to provide an interference fit between the hard drive and the housing, wherein the housing has a removable cover extending over the upper portion of the hard drive, and a cage formed by a plurality of articulated arms that define an area for receiving the housing.

6. The assembly of claim 5 wherein the arms are adapted to flex, the dimensions of the area defined by the cage being less than that of the housing so that, when the housing is placed in the area, at least a portion of the arms are placed under tension.

7. The assembly of claim 5 further comprising a first connector connected to the hard drive, a second connector adapted to connect to the computer and a flexible cable extending between, and connected to, the first and second connectors, to reduce the transfer of shock forces applied thereto in and about all three major Cartesian axes.

8. The assembly of claim 7 wherein the second connector is connected to the cage.

9. A computer comprising an enclosure; a processor disposed in the enclosure; a memory device disposed in the enclosure; and a hard drive-carrier assembly mounted in the enclosure, the assembly comprising a housing disposed in the computer enclosure and defining a space, a hard drive mounted in the space of the housing, and a cage formed by a plurality of articulated arms that define an area for receiving the housing, the dimensions of the area being less than that of the housing so that, when the housing is placed in the area, at least a portion of the arms are placed under tension.

10. The computer of claim 9 wherein the housing has a removable cover extending over the upper portion of the hard drive.

11. The computer of claim 9 wherein the computer further comprises a motherboard, and wherein the assembly further comprises a connector assembly attached to the cage and comprising a first connector connected to the hard drive, a second connector adapted to connect to the motherboard, and a perforated flexible cable extending between, and connected to, the first and second connectors, to reduce the transfer of shock forces applied thereto in and about all three major Cartesian axes.

12. A hard drive-carrier assembly for a computer, the assembly comprising a housing defining a space, a hard drive mounted in the space of the housing, and a cage formed by a plurality of articulated arms that define an area for receiving the housing, the dimensions of the area being less than that of the housing so that, when the housing is placed in the area, at least a portion of the arms are placed under tension.

13. The assembly of claim 12 wherein the housing has a removable cover extending over the upper portion of the hard drive.

14. The assembly of claim 12 further comprising a first connector connected to the hard drive, a second connector adapted to connect to a computer, and a flexible cable extending between, and connected to, the first and second connectors, to reduce the transfer of shock forces applied thereto in and about all three major Cartesian axes.

15. A computer comprising an enclosure; a motherboard disposed in the enclosure; a processor disposed in the enclosure and connected to the motherboard; a memory device disposed in the enclosure and connected to the motherboard; and a hard drive-carrier assembly mounted in the enclosure, the assembly comprising a housing disposed in the computer enclosure and defining a space, a hard drive mounted in the space of the housing, a cage formed by a plurality of articulated arms that define an area for receiving the housing, and a connector assembly attached to the cage and comprising a first connector connected to the hard drive, a second connector adapted to connect to the motherboard, and a flexible cable extending between, and connected to, the first and second connectors, to reduce the transfer of shock forces applied thereto in and about all three major Cartesian axes.

16. The computer of claim 15 wherein the housing has a removable cover extending over the upper portion of the hard drive.

17. The computer of claim 15 wherein the cable is a ribbon cable having perforations extending therethrough to increase its flexibility.

18. A hard drive-carrier assembly for a computer, the assembly comprising a housing defining a space; a hard drive mounted in the space of the housing; a cage formed by a plurality of articulated arms that define an area for receiving the housing; and a connector assembly attached to the cage and comprising a first connector connected to the hard drive, a second connector adapted to connect to the computer, and a flexible cable extending between, and connected to, the first and second connectors, to reduce the transfer of shock forces applied thereto in and about all three major Cartesian axes.

19. The assembly of claim 18 wherein the housing has a removable cover extending over the upper portion of the hard drive.

20. The computer of claim 18 wherein the cable is a ribbon cable having perforations extending therethrough to increase its flexibility.

21. A connector assembly for connecting a hard drive to a computer, the assembly comprising a first connector adapted to connect to the hard drive, a second connector adapted to connect to the computer, and a perforated flexible cable extending between, and connected to, the first and second connectors, the perforations reducing the transfer of shock forces applied thereto in and about all three major Cartesian axes.

22. A method of mounting a hard drive in a computer enclosure, the method comprising the steps of encapsulating the hard drive in a housing, placing the housing in a cage formed by a plurality of articulated arms, placing the arms in tension, inserting the cage into the enclosure, and electrically connecting the hard drive to a component of the computer.

* * * * *